(12) United States Patent
Lai et al.

(10) Patent No.: US 11,265,986 B2
(45) Date of Patent: *Mar. 1, 2022

(54) LED CONTROLLER, LED CONTROL DEVICE AND LED CONTROL METHOD

(71) Applicant: NOVATEK MICROELECTRONICS CORP., Hsinchu Science Park (TW)

(72) Inventors: Wei-Jen Lai, Yilan (TW); Neng-Chieh Hsu, Hsinchu (TW); Zhen-Guo Ding, Zhubei (TW); Kang-Fan Yeh, Taoyuan (TW)

(73) Assignee: NOVATEK MICROELECTRONICS CORP., Hsinchu Science Park (TW)

( * ) Notice: Subject to any disclaimer, the term of this patent is extended or adjusted under 35 U.S.C. 154(b) by 0 days.

This patent is subject to a terminal disclaimer.

(21) Appl. No.: 17/172,953

(22) Filed: Feb. 10, 2021

(65) Prior Publication Data

US 2021/0168915 A1    Jun. 3, 2021

Related U.S. Application Data

(63) Continuation of application No. 16/902,472, filed on Jun. 16, 2020, now Pat. No. 10,966,296.

(60) Provisional application No. 62/902,215, filed on Sep. 18, 2019.

(51) Int. Cl.
*G09G 3/34* (2006.01)
*G09G 5/12* (2006.01)
*H05B 45/325* (2020.01)

(52) U.S. Cl.
CPC ................ *H05B 45/325* (2020.01)

(58) Field of Classification Search
CPC ...... H05B 45/325; H05B 45/37; H05B 47/16; G09G 3/34; G09G 3/3406; G09G 3/342; G09G 5/10; G09G 5/12; G09G 5/18
See application file for complete search history.

(56) References Cited

U.S. PATENT DOCUMENTS

| | | | |
|---|---|---|---|
| 2008/0238341 A1* | 10/2008 | Korcharz | H05B 45/22 315/297 |
| 2010/0085295 A1* | 4/2010 | Zhao | G09G 3/3406 345/102 |
| 2010/0315442 A1* | 12/2010 | Pauritsch | H05B 45/46 345/690 |
| 2011/0157259 A1* | 6/2011 | Tanaka | H04N 9/3155 345/691 |
| 2016/0338180 A1* | 11/2016 | Archdale | G02B 27/0172 |
| 2018/0233109 A1* | 8/2018 | Lin | G09G 3/342 |

* cited by examiner

*Primary Examiner* — Thai Pham
(74) *Attorney, Agent, or Firm* — Hamre, Schumann, Mueller & Larson, P.C.

(57) ABSTRACT

An LED controller is used with a video source and at least one LED unit, and includes a control signal generator and a driver. The control signal generator performs pulse width modulation based on a first clock signal, a second clock signal and a data signal, which is generated by the video source, to generate at least one control signal. The first and second clock signals are independent of a vertical synchronization signal that is generated by the video source. The driver generates, based on the at least one control signal, at least one drive signal that is related to light emission of the at least one LED unit.

23 Claims, 11 Drawing Sheets

LED CONTROLLER, LED CONTROL DEVICE AND LED CONTROL METHOD

CROSS-REFERENCE TO RELATED APPLICATION

This is a continuation application of U.S. patent application Ser. No. 16/902,472, filed on Jun. 16, 2020, which claims priority of U.S. Provisional Patent Application No. 62/902,215, filed on Sep. 18, 2019.

FIELD

The disclosure relates to light emitting diode (LED) control, and more particularly to an LED controller, an LED control device and an LED control method.

BACKGROUND

Referring to FIG. 1, a conventional light emitting diode (LED) controller 11 receives a vertical synchronization signal (VSYNC), a horizontal synchronization signal (HSYNC) and a data signal (DATA) from a video source 12. The vertical synchronization signal (VSYNC) carries image frequency information. The horizontal synchronization signal (HSYNC) carries line frequency information. The data signal (DATA) carries brightness information and delay information. The conventional LED controller 11 performs pulse width modulation based on the vertical synchronization signal (VSYNC) and the data signal (DATA) to generate a control signal (CS), and generates a drive signal (DS) based on the control signal (CS) for driving a current source 13 to provide a current signal to an LED unit 14, so the LED unit 14 emits light when the current signal has a non-zero magnitude.

Referring to FIGS. 1 to 3, in particular, a pulse width of the control signal (CS) corresponding to a $(p+1)^{th}$ frame is determined by a period of the vertical synchronization signal (VSYNC) corresponding to a $p^{th}$ frame and by the brightness information of the data signal (DATA). Therefore, as shown in FIG. 2, when the period of the vertical synchronization signal (VSYNC) is decreased while the brightness information of the data signal (DATA) is unchanged, a duty cycle of the control signal (CS) initially increases from a target value and then decreases back to the target value, resulting in a flicker of the LED unit 14. Similarly, as shown in FIG. 3, when the period of the vertical synchronization signal (VSYNC) is increased while the brightness information of the data signal (DATA) is unchanged, the duty cycle of the control signal (CS) initially decreases from the target value and then increases back to the target value, resulting in a flicker of the LED unit 14.

SUMMARY

Therefore, an object of the disclosure is to provide a light emitting diode (LED) controller, an LED control device and an LED control method that can alleviate the drawback of the prior art.

According to an aspect of the disclosure, the LED controller is used with a video source and at least one LED unit. The video source generates a data signal and a vertical synchronization signal. The LED controller includes a control signal generator and a driver. The control signal generator is for receiving a first clock signal and a second clock signal, is adapted to be coupled to the video source for receiving the data signal therefrom, and performs pulse width modulation based on the first and second clock signals and on the data signal to generate at least one control signal. The first and second clock signals are independent of the vertical synchronization signal. The driver is coupled to the control signal generator for receiving the at least one control signal therefrom, and generates, based on the at least one control signal, at least one drive signal that is related to light emission of the at least one LED unit.

According to another aspect of the disclosure, the LED control device is used with a video source and a plurality of LED groups. The video source generates a plurality of data signals and a vertical synchronization signal. Each of the LED groups includes a plurality of LED units. The LED control device includes a plurality of LED controllers each including a control signal generator and a driver. The control signal generator is for receiving a first clock signal and a second clock signal, is adapted to be coupled to the video source for receiving a respective one of the data signals therefrom, and performs pulse width modulation based on the first and second clock signals and on the respective one of the data signals to generate a plurality of control signals. The first and second clock signals are independent of the vertical synchronization signal. The driver is coupled to the control signal generator for receiving the control signals therefrom, and generates, based on the control signals, a plurality of drive signals that are related to light emission of the LED units of a respective one of the LED groups.

According to yet another aspect of the disclosure, the LED control method is to be implemented by an LED controller that is used with a video source and an LED unit. The video source generates a data signal and a vertical synchronization signal. The LED control method includes: performing pulse width modulation based on a first clock signal, a second clock signal and the data signal to generate a control signal, the first and second clock signals being independent of the vertical synchronization signal; and generating, based on the control signal, a drive signal that is related to light emission of the LED unit.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Figure 1:
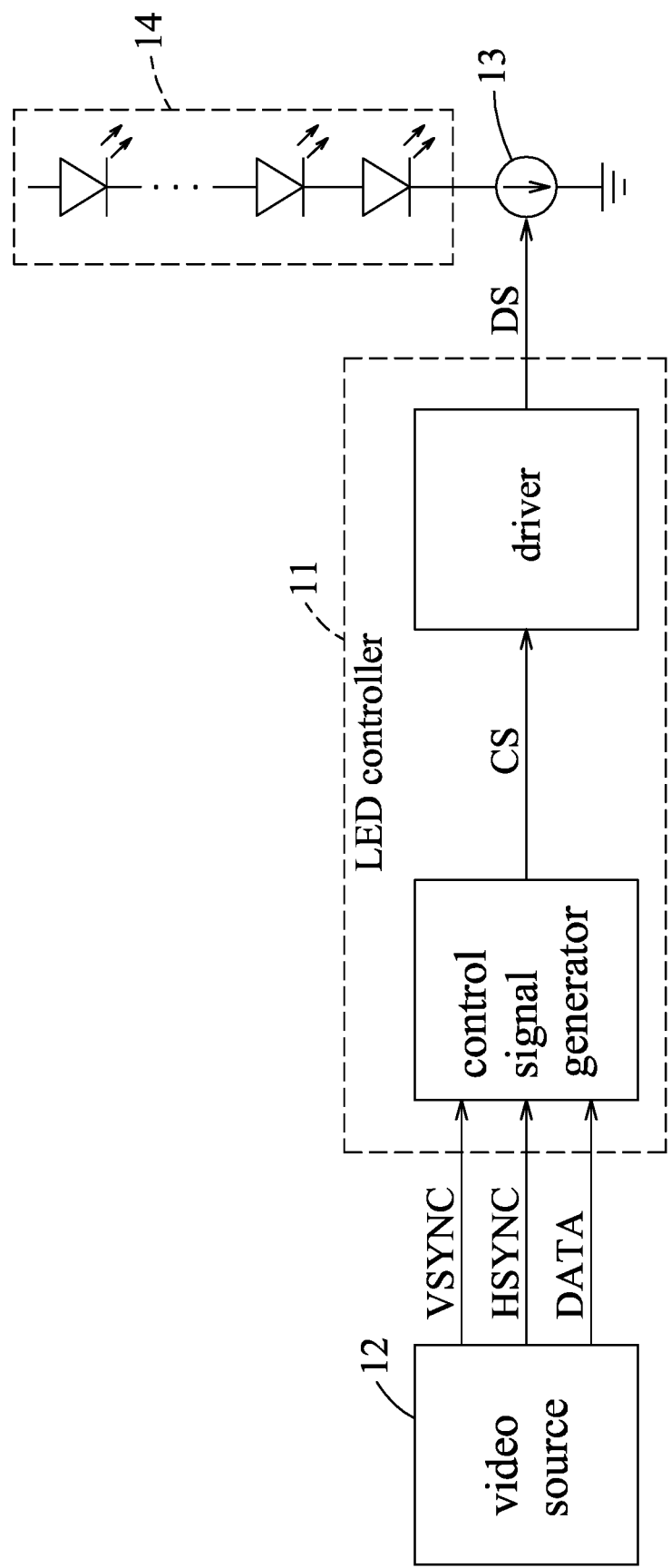
FIG. 1 is a circuit block diagram illustrating a conventional light emitting diode (LED) controller.
Figure 2:
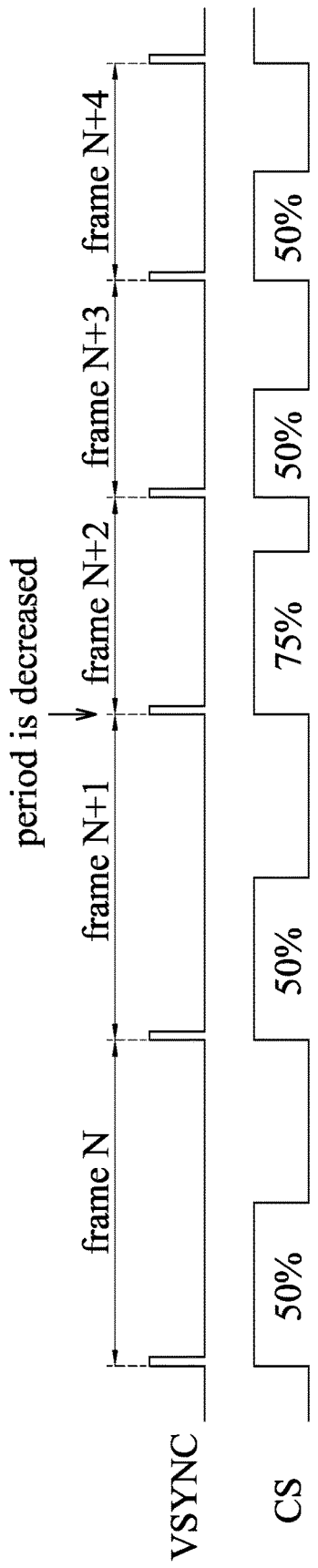
FIG. 2 is a timing diagram illustrating a change of a control signal of the conventional LED controller in response to a decrease of a period of a vertical synchronization signal.
Figure 3:
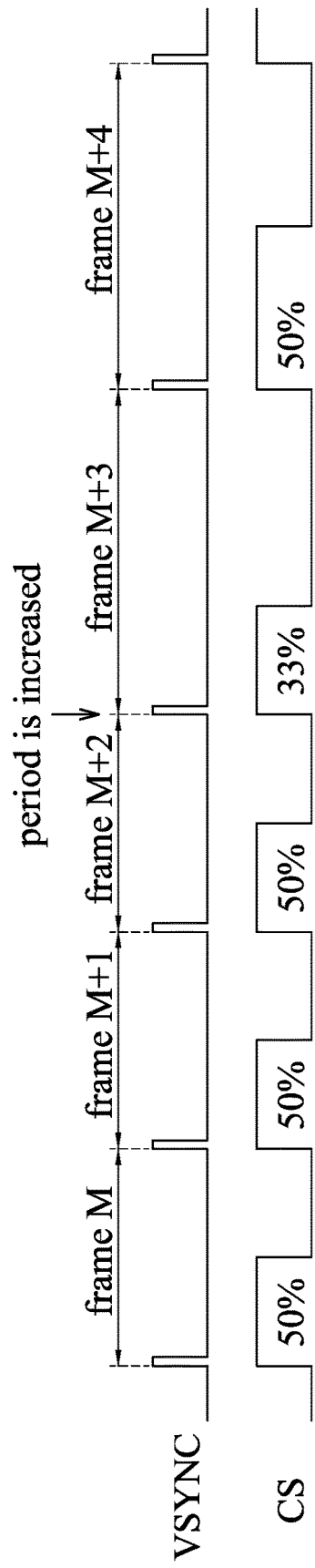
FIG. 3 is a timing diagram illustrating a change of the control signal of the conventional LED controller in response to an increase of the period of the vertical synchronization signal.

Before the disclosure is described in greater detail, it should be noted that where considered appropriate, reference numerals or terminal portions of reference numerals have been repeated among the figures to indicate corresponding or analogous elements, which may optionally have similar characteristics.

Figure 4:
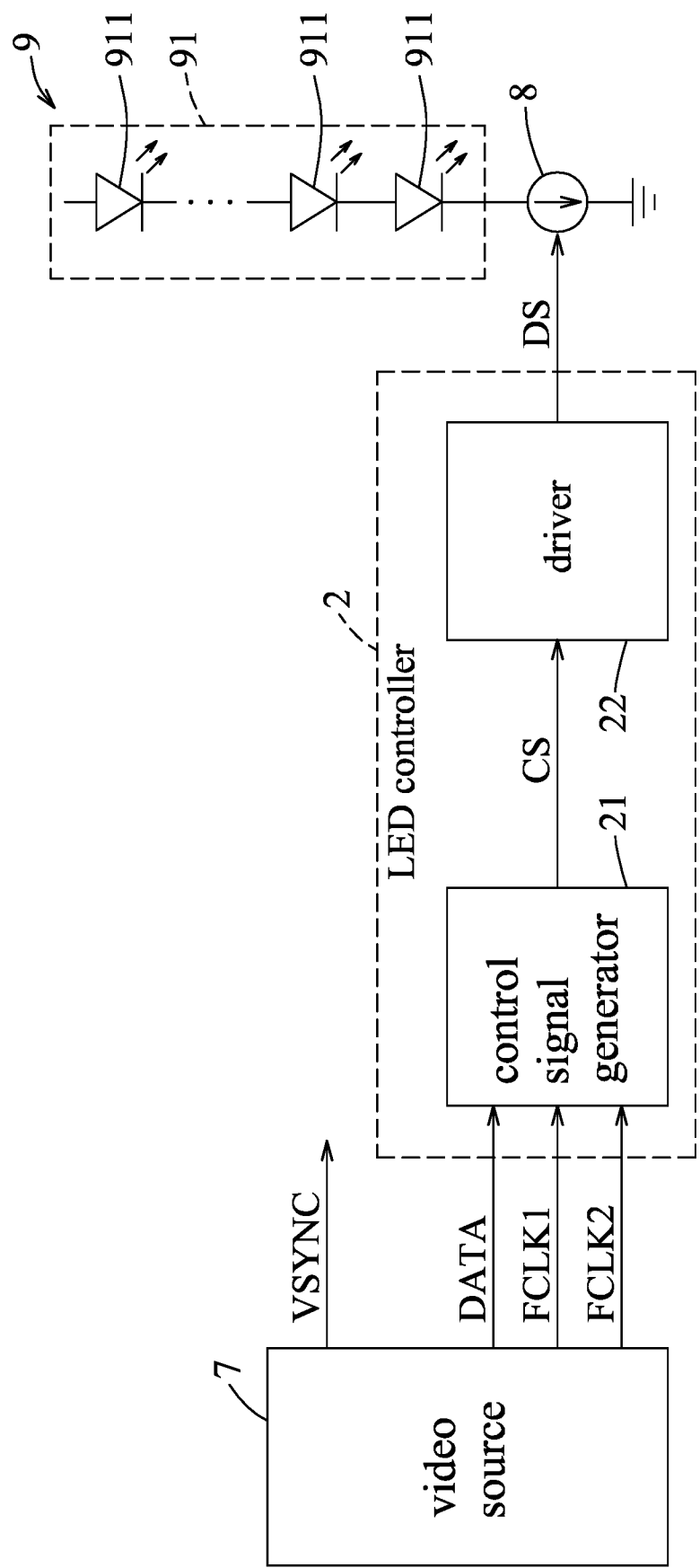
FIG. 4 is a circuit block diagram illustrating a first embodiment of an LED controller according to the disclosure.
Figure 5:
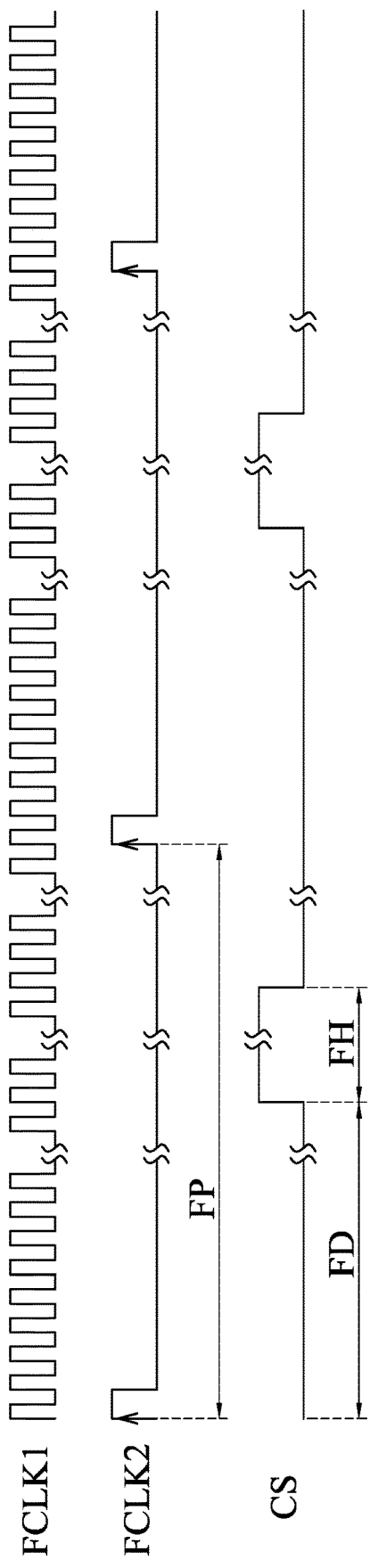
FIG. 5 is a timing diagram illustrating relationships among a first clock signal, a second clock signal and a control signal of the first embodiment.
Figure 6:
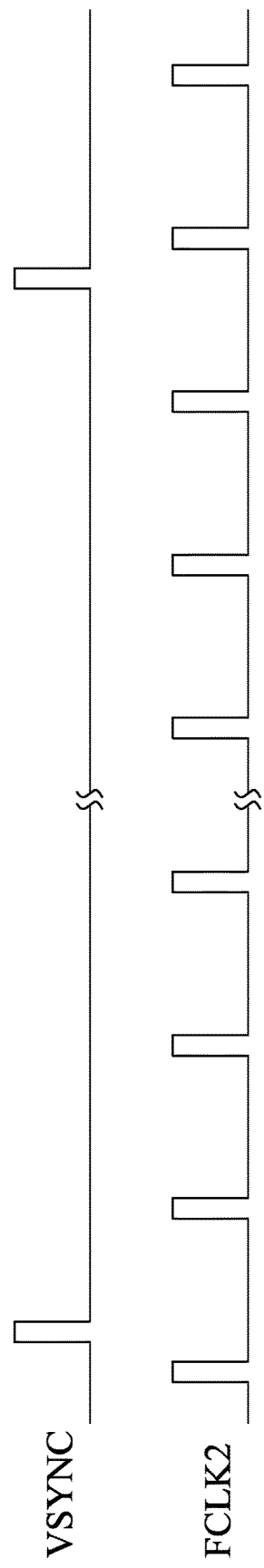
FIG. 6 is a timing diagram illustrating relationships between the second clock signal of the first embodiment and a vertical synchronization signal.

Referring to FIG. 4, a first embodiment of a light emitting diode (LED) controller 2 according to the disclosure is used with a video source 7, a current source 8 and an LED group 9. The video source 7 generates a vertical synchronization signal (VSYNC), a data signal (DATA), a first clock signal (FCLK1) and a second clock signal (FCLK2). The vertical synchronization signal (VSYNC) carries image frequency information, and has a variable frequency within a range of, for example, 70 Hz to 144 Hz. The data signal (DATA) carries brightness information and delay information. The first clock signal (FCLK1) has a fixed frequency of, for example, 12 MHz. The second clock signal (FCLK2) has a variable frequency (e.g., 1 KHz) that is higher than (e.g., about ten times) the frequency of the vertical synchronization signal (VSYNC), and that is lower than the frequency of the first clock signal (FCLK1). The frequency of the first clock signal (FCLK1) is multiple to the frequency of the second clock signal (FCLK2). In particular, as shown in FIGS. 5 and 6, the second clock signal (FCLK2) is synchronous to the first clock signal (FCLK1), and the first and second clock signals (FCLK1, FCLK2) are independent of the vertical synchronization signal (VSYNC). The LED group 9 includes an LED unit 91 that is coupled to the current source 8, and that includes at least one LED 911.

The LED controller 2 of this embodiment includes a control signal generator 21 and a driver 22. The control signal generator 21 is adapted to be coupled to the video source 7 for receiving the first and second clock signals (FCLK1, FCLK2) and the data signal (DATA) therefrom, and performs pulse width modulation based on the first and second clock signals (FCLK1, FCLK2) and on the data signal (DATA) to generate a control signal (CS). The driver 22 is coupled to the control signal generator 21 for receiving the control signal (CS) therefrom, is adapted to be coupled further to the current source 8, and generates a drive signal (DS) based on the control signal (CS) for driving the current source 8 to provide a current signal to the LED unit 91, so the LED unit 91 emits light when the current signal has a non-zero magnitude.

In this embodiment, as shown in FIG. 5, the control signal (CS) has a switching frequency of 1/FP, a pulse width of FH and a pulse delay with respect to the second clock signal (FCLK2) of FD. The switching frequency of the control signal (CS) is equal to the frequency of the second clock signal (FCLK2). The pulse width of the control signal (CS) is determined by the frequency of the first clock signal (FCLK1) and the brightness information of the data signal (DATA) (e.g., a multiple integral of a period of the first clock signal (FCLK1), which is variable according to the brightness information of the data signal (DATA)). The pulse delay of the control signal (CS) with respect to the second clock signal (FCLK2) is determined by the frequency of the first clock signal (FCLK1) and the delay information of the data signal (DATA) (e.g., a multiple integral of the period of the first clock signal (FCLK1), which is variable according to the delay information of the data signal (DATA)). Within each pulse of the control signal (CS), the magnitude of the current signal is non-zero, and the LED unit 91 emits light. Outside each pulse of the control signal (CS), the magnitude of the current signal is zero, and the LED unit 91 does not emit light. In addition, the LED controller 2 is fabricated on a single chip, and the current source 8 may be or may not be fabricated on the chip. It should be noted that the switching frequency of the control signal (CS) may be multiple to the frequency of the second clock signal (FCLK2) in other embodiments.

Figure 7:
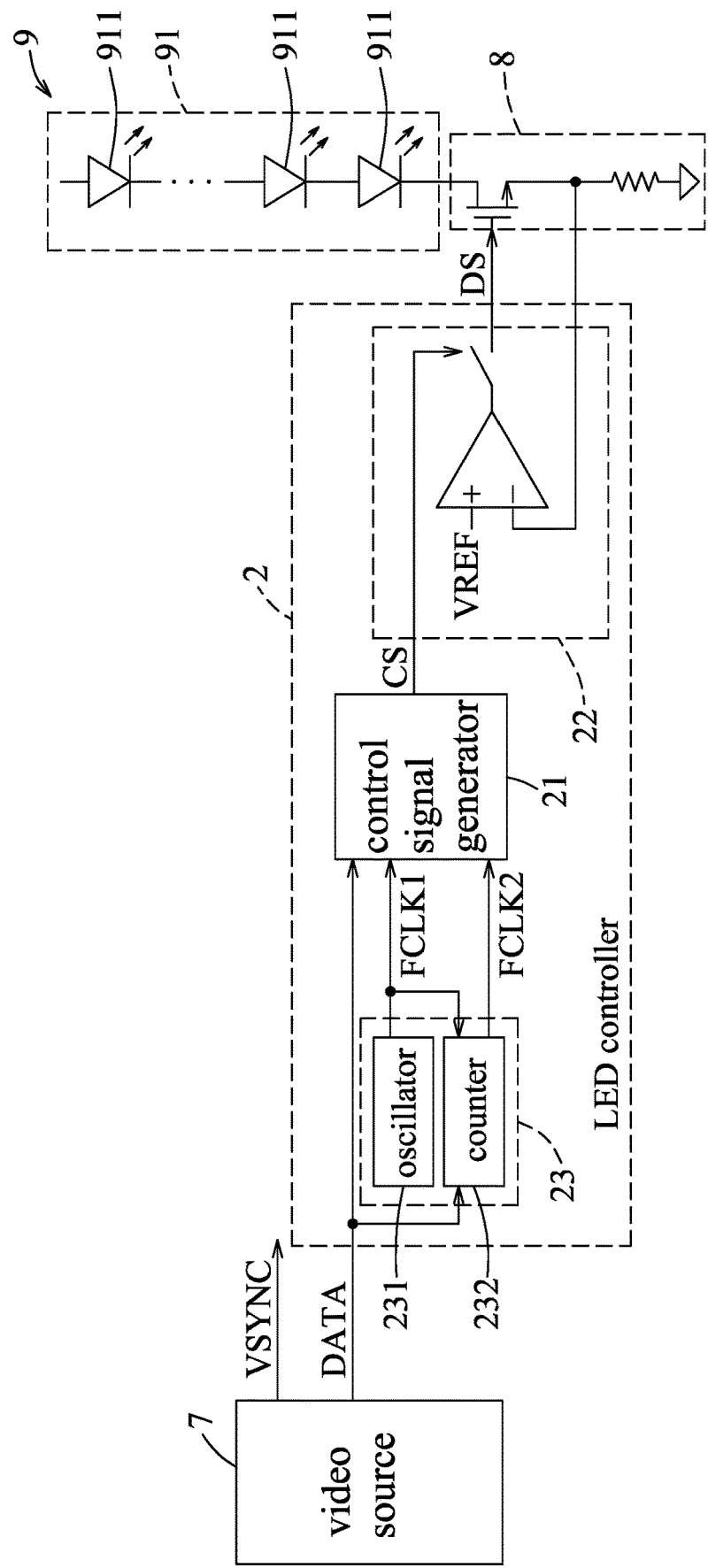
FIG. 7 is a circuit block diagram illustrating a second embodiment of the LED controller according to the disclosure.

Referring to FIG. 7, a second embodiment of the LED controller 2 according to the disclosure is similar to the first embodiment, and differs from the first embodiment in that: (a) the data signal (DATA) further carries period information; (b) the LED controller 2 further includes a clock signal generator 23; and (c) the first and second clock signals (FCLK1, FCLK2) are generated by the clock signal generator 23, instead of the video source 7.

In the second embodiment, the clock signal generator 23 includes an oscillator 231 and a counter 232. The oscillator 231 is coupled to the control signal generator 21, and generates the first clock signal (FCLK1) for receipt by the control signal generator 21. The counter 232 is coupled to the oscillator 231 for receiving the first clock signal (FCLK1) therefrom, is adapted to be further coupled to the video source 7 for receiving the data signal (DATA) therefrom, and is further coupled to the control signal generator 21. The counter 232 counts based on the first clock signal (FCLK1) and the data signal (DATA) to generate the second clock signal (FCLK2) for receipt by the control signal generator 21. A period of the second clock signal (FCLK2) is a multiple integral of the period of the first clock signal (FCLK1), which is variable according to the period information of the data signal (DATA). It should be noted that, in other embodiments, the counter 232 may count based on period information built therein, and the period information contained in the data signal (DATA) may be omitted.

It should be noted that FIG. 7 depicts exemplary implementations of the driver 22 and the current source 8, but the disclosure is not limited thereto.

Figure 8:
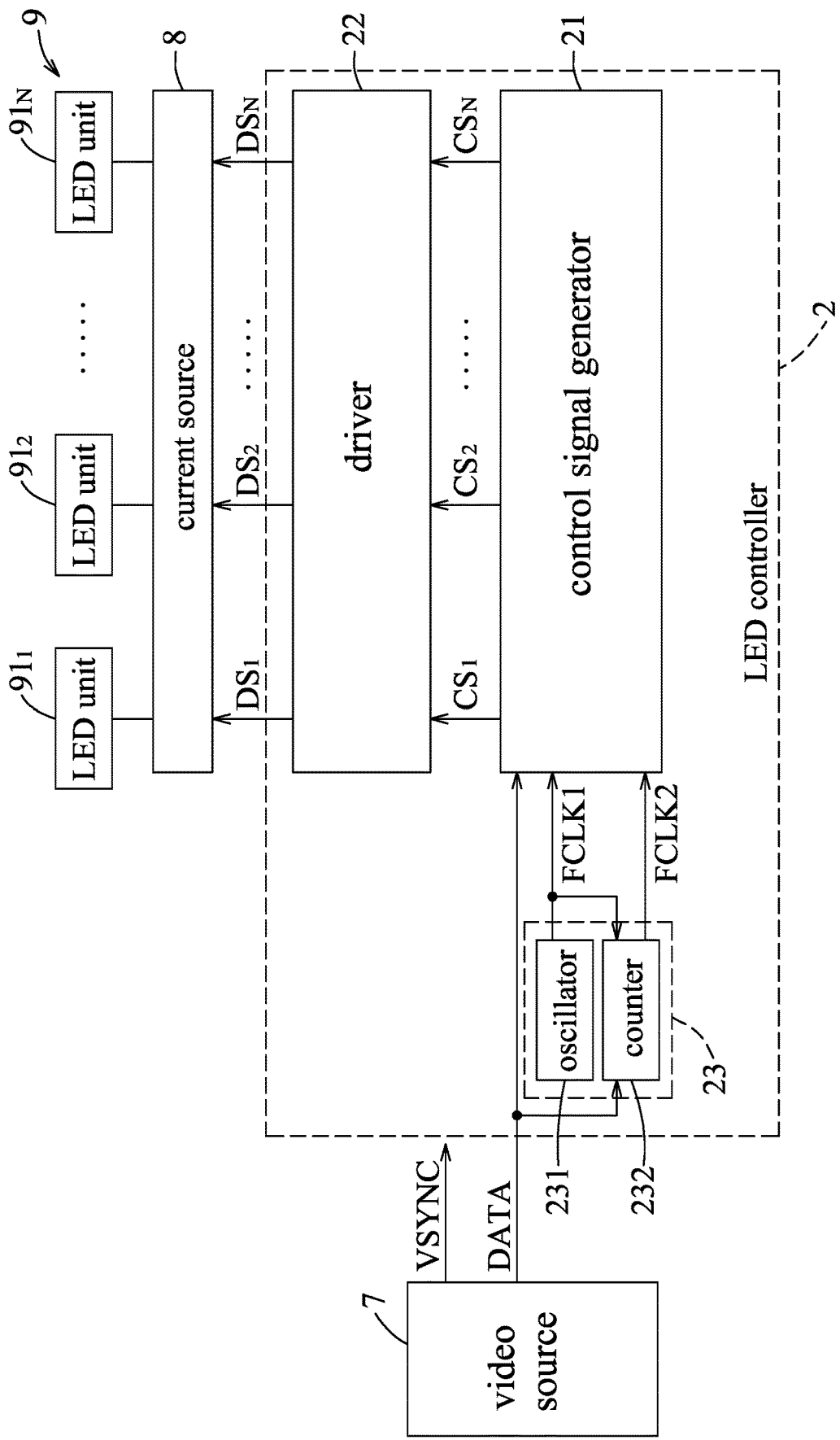
FIG. 8 is a block diagram illustrating a third embodiment of the LED controller according to the disclosure.

Referring to FIG. 8, a third embodiment of the LED controller 2 according to the disclosure is similar to the second embodiment, and differs from the second embodiment in that: (a) the LED group 9 includes a plurality of LED units ($91_1$-$91_N$); (b) the data signal (DATA) carries multiple pieces of brightness information that respectively correspond to the LED units ($91_1$-$91_N$), and multiple pieces of delay information that respectively correspond to the LED units ($91_1$-$91_N$); (c) the control signal generator 21 performs pulse width modulation based on the first and second clock signals (FCLK1, FCLK2) and the data signal (DATA) to generate a plurality of control signals ($CS_1$-$CS_N$) that respectively correspond to the LED units ($91_1$-$91_N$); and (d) the driver 22 receives the control signals ($CS_1$-$CS_N$) from the control signal generator 21, and generates, based on the control signals ($CS_1$-$CS_N$), a plurality of drive signals ($DS_1$-$DS_N$) that respectively correspond to the LED units ($91_1$-$91_N$) for driving the current source 8 to provide a plurality of current signals respectively to the LED units ($91_1$-$91_N$), so each of the LED units ($91_1$-$91_N$) emits light when a corresponding one of the current signals has a non-zero magnitude.

Figure 9:
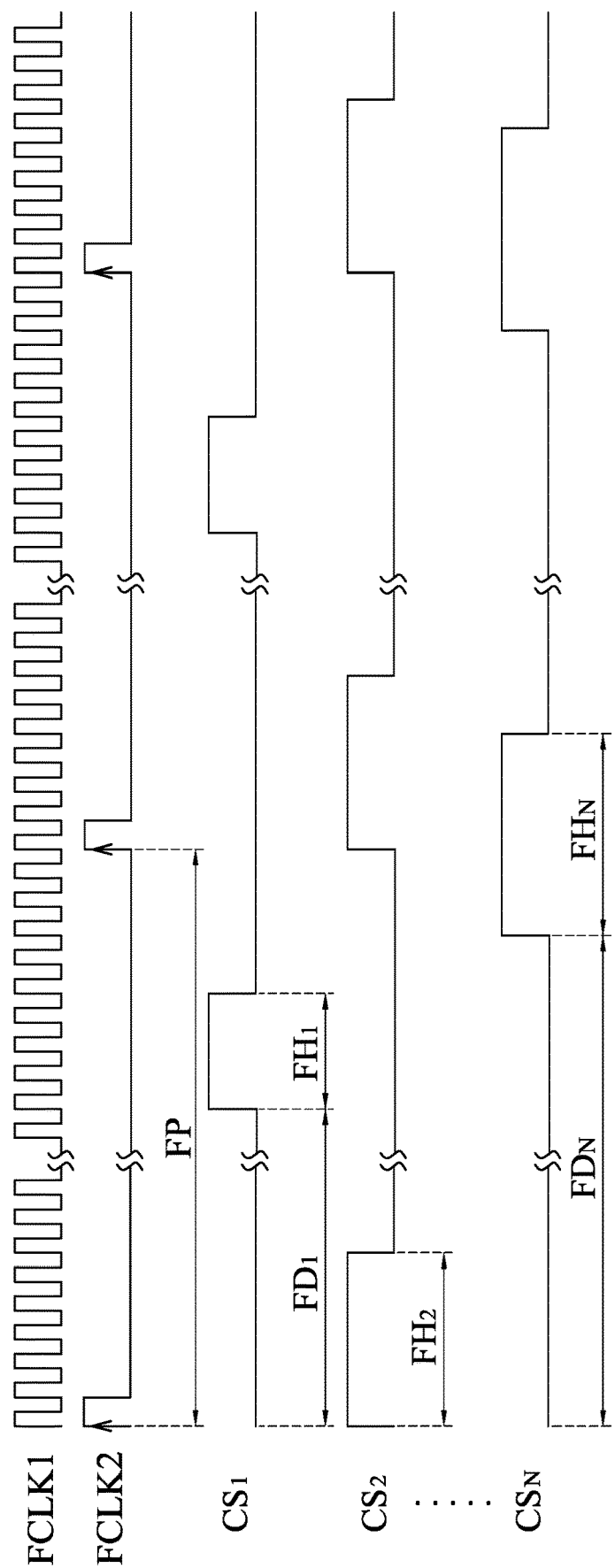
FIG. 9 is a timing diagram illustrating relationships among a first clock signal, a second clock signal and a plurality of control signals of the third embodiment.

In the third embodiment, as shown in FIG. 9, one of the control signals ($CS_n$) that corresponds to an $n^{th}$ one of the LED units ($91_n$) has a switching frequency of 1/FP, a pulse width of $FH_n$ and a pulse delay with respect to the second clock signal (FCLK2) of $FD_n$, where 1≤n≤N and N is a total number of the LED units ($91_1$-$91_N$). The switching frequency of the control signal ($CS_n$) is equal to the frequency of the second clock signal (FCLK2). The pulse width of the control signal ($CS_n$) is determined by the frequency of the first clock signal (FCLK1) and one of the pieces of the brightness information of the data signal (DATA) that corresponds to the LED unit ($91_n$) (e.g., a multiple integral of a period of the first clock signal (FCLK1) variable according to said one of the pieces of the brightness information of the data signal (DATA)). The pulse delay of the control signal ($CS_n$) with respect to the second clock signal (FCLK2) is determined by the frequency of the first clock signal (FCLK1) and one of the pieces of the delay information of the data signal (DATA) that corresponds to the LED unit ($91_n$) (e.g., a multiple integral of the period of the first clock signal (FCLK1) variable according to said one of the pieces of the delay information of the data signal (DATA)). Within each pulse of the control signal ($CS_n$), the magnitude of the current signal that corresponds to the LED unit ($91_n$) is non-zero, and the LED unit ($91_n$) emits light. Outside each pulse of the control signal (CS), the magnitude of the current signal that corresponds to the LED unit ($91_n$) is zero, and the LED unit ($91_n$) does not emit light.

Figure 10:
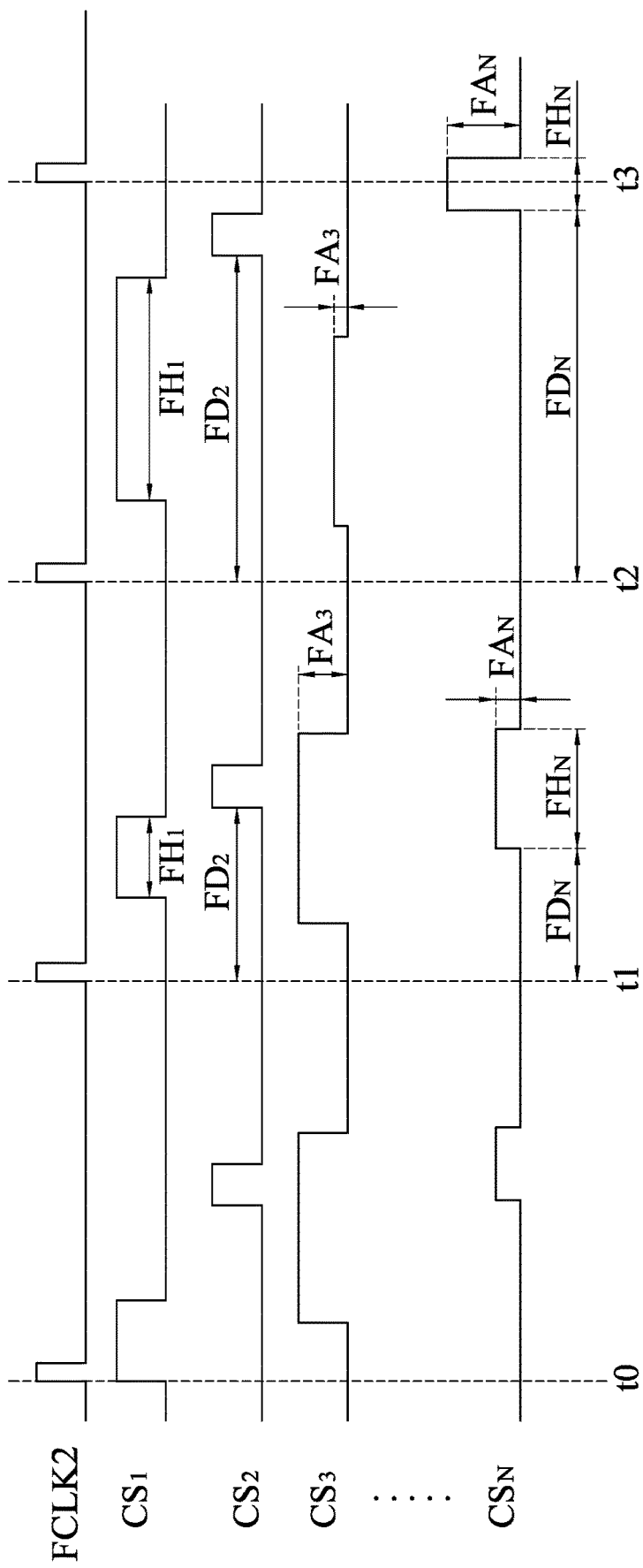
FIG. 10 is a timing diagram illustrating a second clock signal and a plurality of control signals of a modification of the third embodiment.

FIG. 10 illustrates a modification of the third embodiment, and differs from the third embodiment in that: (a) the data signal (DATA) further carries multiple pieces of amplitude information that respectively correspond to the LED units ($91_1$-$91_N$) (see FIG. 8); and (b) each control signal ($CS_n$) has a pulse height of $FA_n$ determined by one of the pieces of the amplitude information of the data signal (DATA) that corresponds to the LED unit ($91_n$), where 1≤n≤N. Therefore, in the modification of the third embodiment, within each pulse of the control signal ($CS_n$), the magnitude of the current signal that corresponds to the LED unit ($91_n$) and an intensity of the light emitted by the LED unit ($91_n$) are variable according to the amplitude information that corresponds to the LED unit ($91_n$), thereby enhancing brightness resolution of the LED units ($91_1$-$91_N$).

Figure 11:
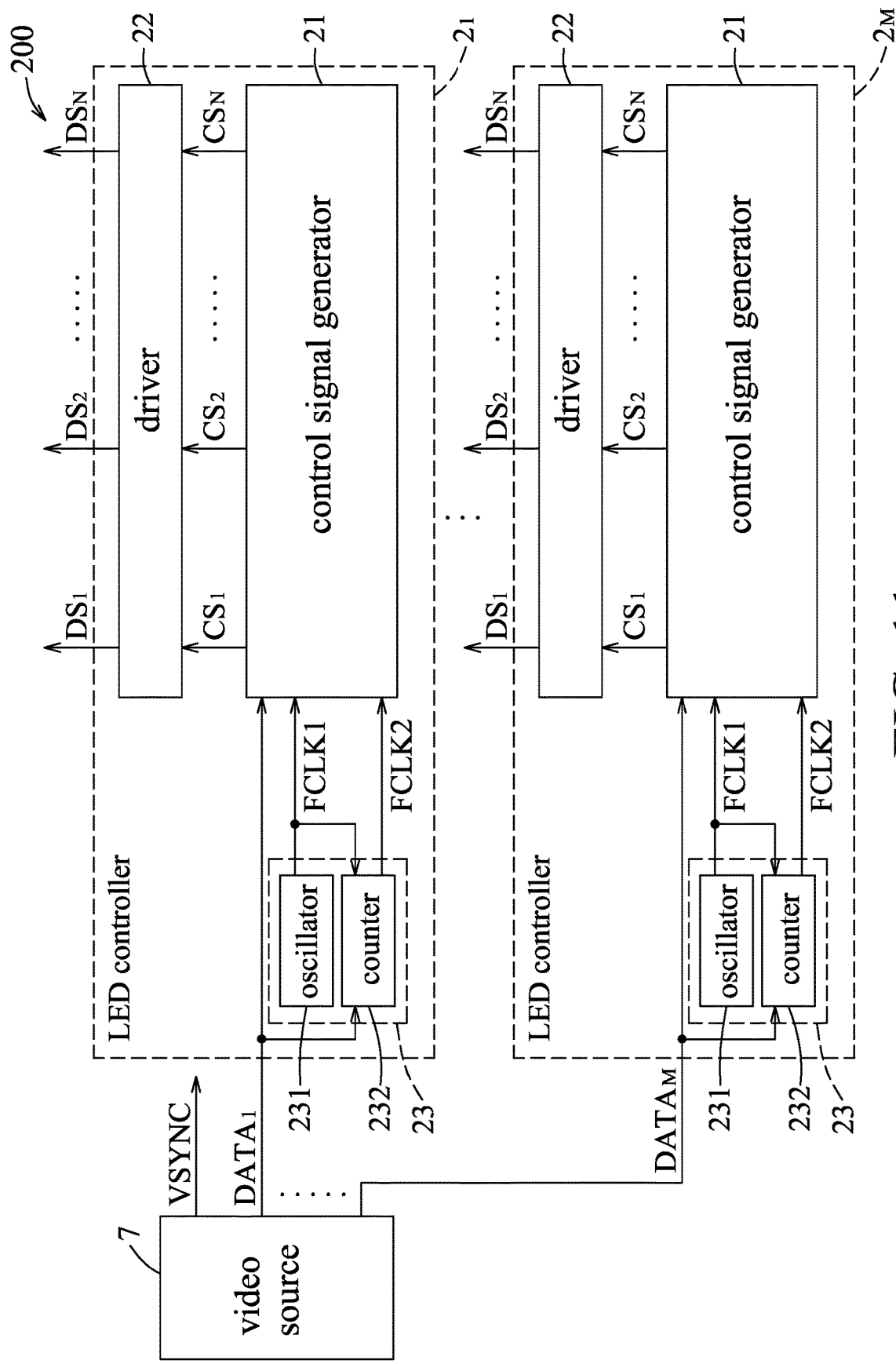
FIG. 11 is a block diagram illustrating a first embodiment of an LED control device according to the disclosure.

Referring to FIG. 11, a first embodiment of an LED control device 200 according to the disclosure is used with a video source 7, a plurality of current sources (not shown) and a plurality of LED groups (not shown). Each of the LED groups includes a plurality of LED units that are coupled to a respective one of the current sources. The video source 7 generates a vertical synchronization signal (VSYNC) and a plurality of data signals ($DATA_1$-$DATA_M$). The vertical synchronization signal (VSYNC) carries image frequency information, and has a variable frequency. Each of the data signals ($DATA_1$-$DATA_M$) corresponds to a respective one of the LED groups, and carries period information, multiple pieces of brightness information that respectively correspond to the LED units of the respective one of the LED groups, and multiple pieces of delay information that respectively correspond to the LED units of the respective one of the LED groups.

The control device 200 of this embodiment includes a plurality of the LED controllers ($2_1$-$2_M$) as shown in FIG. 8, each of which corresponds to a respective one of the LED groups. For one of the LED controllers ($2_m$) that corresponds to an $m^{th}$ one of the LED groups (where 1≤m≤M and M is a total number of the LED groups), the control signal generator 21 is coupled to the video source 7 for receiving one of the data signals ($DATA_m$) that corresponds to the $m^{th}$ one of the LED groups therefrom; and the driver 22 is coupled to one of the current sources that corresponds to the $m^{th}$ one of the LED groups, and outputs the drive signals ($DS_1$-$DS_N$) for driving said one of the current sources to provide a plurality of current signals respectively to the LED units ($91_1$-$91_N$) of the $m^{th}$ one of the LED groups.

In this embodiment, the first and second clock signals (FCLK1, FCLK2) generated by each of the LED controllers ($2_1$-$2_M$) are independent of the vertical synchronization signal (VSYNC). In addition, the first clock signals (FCLK1) generated by the LED controllers ($2_1$-$2_M$) have substantially the same frequency, and are asynchronous to one another; and the second clock signals (FCLK2) generated by the LED controllers ($2_1$-$2_M$) have substantially the same frequency, and are asynchronous to one another. Therefore, the LED controllers ($2_1$-$2_M$) are asynchronous to one another in operation. Moreover, each of the LED controllers ($2_1$-$2_M$) is fabricated on a single and respective chip.

Figure 12:
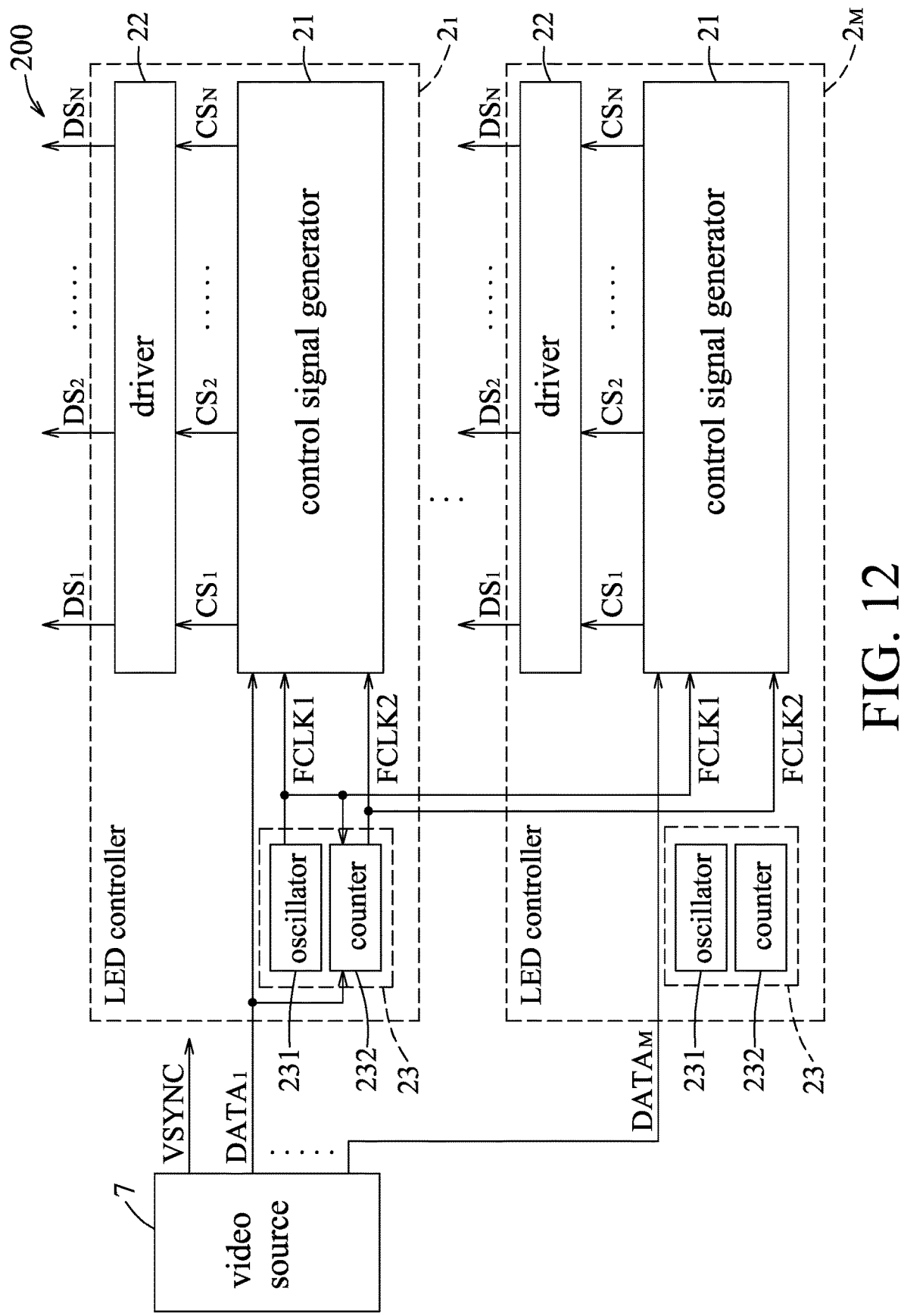
FIG. 12 is a block diagram illustrating a second embodiment of the LED control device according to the disclosure.

Referring to FIG. 12, a second embodiment of the LED control device 200 according to the disclosure is similar to the first embodiment, and differs from the first embodiment in that the control signal generator 21 of each of the LED controllers ($2_1$-$2_M$) is coupled to the clock signal generator 23 of a selected one of the LED controllers ($2_1$) for receiving the first and second clock signals (FCLK1, FCLK2) therefrom. Therefore, the LED controllers ($2_1$-$2_M$) are synchronous to one another in operation.

Figure 13:
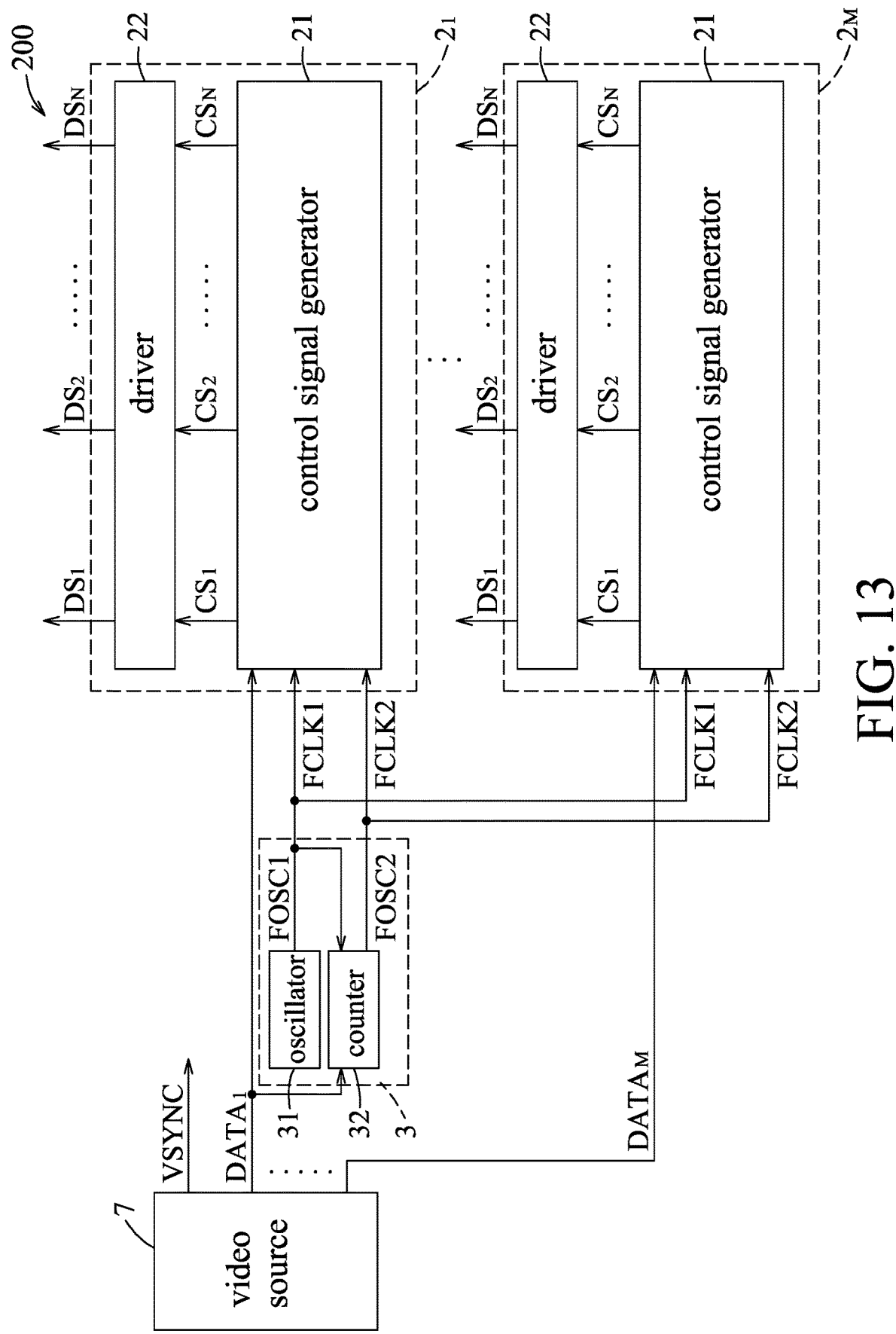
FIG. 13 is a block diagram illustrating a third embodiment of the LED control device according to the disclosure.

Referring to FIG. 13, a third embodiment of the LED control device 200 according to the disclosure is similar to the second embodiment, and differs from the second embodiment in that: (a) each of the LED controllers ($2_1$-$2_M$) does not include the clock signal generator 23 (see FIG. 12); and (b) the LED control device 200 further includes a clock signal generator 3.

In the third embodiment, the clock signal generator 3 is fabricated on a single chip different from the chips on which the LED controllers ($2_1$-$2_M$) are respectively fabricated, and includes an oscillator 31 and a counter 32. The oscillator 31 is coupled to the control signal generators 21 of the LED controllers ($2_1$-$2_M$), and generates a first oscillation signal (FOSC1) for receipt by the control signal generator 21 of each of the LED controllers ($2_1$-$2_M$) to serve as the first clock signal (FCLK1). The counter 32 is coupled to the oscillator 31 for receiving the first oscillation signal (FOSC1) therefrom, is adapted to be further coupled to the video source 7 for receiving a selected one of the data signals ($DATA_1$) therefrom, and is further coupled to the control signal generators 21 of the LED controllers ($2_1$-$2_M$). The counter 32 counts based on the first oscillation signal (FOSC1) and the data signal ($DATA_1$) to generate a second oscillation signal (FOSC2) for receipt by the control signal generator 21 of each of the LED controllers ($2_1$-$2_M$) to serve as the second clock signal (FCLK2). A period of the second oscillation signal (FOSC2) is a multiple integral of a period of the first oscillation signal (FOSC1), which is variable according to the period information of the data signal (DATA$_1$).

Referring to FIGS. 4, 7, 8 and 11 to 13, in view of the above, for each of the aforesaid embodiments, since the control signal(s) (CS/CS$_1$-CS$_N$) related to light emission of the LED unit(s) 91 is(are) generated based on the first and second clock signals (FCLK1, FCLK2) that are independent of the vertical synchronization signal (VSYNC), the LED unit(s) 91 will not flicker when a period of the vertical synchronization signal (VSYNC) is changed.

In the description above, for the purposes of explanation, numerous specific details have been set forth in order to provide a thorough understanding of the embodiments. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what are considered the exemplary embodiments, it is understood that the disclosure is not limited to the disclosed embodiments but is intended to cover various arrangements included within the spirit and scope of the broadest interpretation so as to encompass all such modifications and equivalent arrangements.

What is claimed is:

1. A light emitting diode (LED) controller used with a video source and at least one LED unit, the video source generating a data signal and at least one synchronization signal, said LED controller comprising:
    a control signal generator adapted to be coupled to the video source for receiving the data signal therefrom, and performing pulse width modulation based on the data signal to generate at least one control signal that is independent of the at least one synchronization signal; and
    a driver coupled to said control signal generator for receiving the at least one control signal therefrom, and generating, based on the at least one control signal, at least one drive signal that is related to light emission of the at least one LED unit.

2. The LED controller of claim 1, wherein said control signal generator is for further receiving a first clock signal and a second clock signal, and performs pulse width modulation further based on the first and second clock signals.

3. The LED controller of claim 2, wherein the first clock signal has a frequency that is multiple to a frequency of the second clock signal, and the second clock signal is synchronous to the first clock signal.

4. The LED controller of claim 3, wherein each of the at least one control signal has a switching frequency that is equal or multiple to the frequency of the second clock signal, and has a pulse width and a pulse delay with respect to the second clock signal that are determined by the first clock signal and the data signal.

5. The LED controller of claim 2, further comprising a clock signal generator that is coupled to said control signal generator, and that generates the first and second clock signals for receipt by said control signal generator.

6. The LED controller of claim 5, wherein said clock signal generator includes:
    an oscillator coupled to said control signal generator, and generating the first clock signal for receipt by said control signal generator; and
    a counter coupled to said oscillator for receiving the first clock signal therefrom, further coupled to said control signal generator, and counting based on the first clock signal to generate the second clock signal for receipt by said control signal generator.

7. The LED controller of claim 6, wherein said counter is adapted to be further coupled to the video source for receiving the data signal therefrom, and counts based further on the data signal in such a way that a period of the second clock signal is a multiple integral of a period of the first clock signal, which is determined by the data signal.

8. The LED controller of claim 1, wherein the at least one synchronization signal is a vertical synchronization signal.

9. A light emitting diode (LED) control device used with a video source and a plurality of LED groups, the video source generating a plurality of data signals and at least one synchronization signal, each of the LED groups including a plurality of LED units, said LED control device comprising a plurality of LED controllers each including:
    a control signal generator adapted to be coupled to the video source for receiving a respective one of the data signals therefrom, and performing pulse width modulation based on the respective one of the data signals to generate a plurality of control signals that are independent of the at least one synchronization signal; and
    a driver coupled to said control signal generator for receiving the control signals therefrom, and generating, based on the control signals, a plurality of drive signals that are related to light emission of the LED units of a respective one of the LED groups.

10. The LED control device of claim 9, wherein for each of said LED controllers, said control signal generator is for further receiving a first clock signal and a second clock signal, and performs pulse width modulation further based on the first and second clock signals.

11. The LED control device of claim 10, wherein for each of said LED controllers, the first clock signal has a frequency that is multiple to a frequency of the second clock signal, and the second clock signal is synchronous to the first clock signal.

12. The LED control device of claim 11, wherein for each of said LED controllers, each of the control signals has a switching frequency that is equal or multiple to the frequency of the second clock signal, and has a pulse width and a pulse delay with respect to the second clock signal that are determined by the first clock signal and the respective one of the data signals.

13. The LED control device of claim 10, wherein:
    each of said LED controllers further includes a clock signal generator; and
    for each of said LED controllers, said clock signal generator is coupled to said control signal generator, and generates the first and second clock signals for receipt by said control signal generator.

14. The LED control device of claim 13, wherein for each of said LED controllers, said clock signal generator is adapted to be coupled to the video source for receiving the respective one of the data signals therefrom, and generates the second clock signal based on the first clock signal and the respective one of the data signals in such a way that a period of the second clock signal is a multiple integral of a period of the first clock signal, which is determined by the respective one of the data signals.

15. The LED control device of claim 10, further comprising a clock signal generator that is coupled to said control signal generators of said LED controllers, and that generates a first oscillation signal and a second oscillation signal for receipt by said control signal generator of each of said LED controllers to respectively serve as the first and second clock signals.

16. The LED control device of claim 15, wherein said clock signal generator is adapted to be coupled to the video source for receiving one of the data signals therefrom, and generates the second oscillation signal based on the first oscillation signal and said one of the data signals in such a way that a period of the second oscillation signal is a multiple integral of a period of the first oscillation signal, which is determined by said one of the data signals.

17. The LED control device of claim 9, wherein the at least one synchronization signal is a vertical synchronization signal.

18. A light emitting diode (LED) control method to be implemented by an LED controller that is used with a video source and an LED unit, the video source generating a data signal and at least one synchronization signal, said LED control method comprising:

performing pulse width modulation based on a first clock signal, a second clock signal and the data signal to generate a control signal that is independent of the at least one synchronization signal; and generating, based on the control signal, a drive signal that is related to light emission of the LED unit.

19. The LED control method of claim 18, wherein the first clock signal has a frequency that is multiple to a frequency of the second clock signal, and the second clock signal is synchronous to the first clock signal.

20. The LED control method of claim 19, wherein the control signal has a switching frequency that is equal or multiple to the frequency of the second clock signal, and has a pulse width and a pulse delay with respect to the second clock signal that are determined by the first clock signal and the data signal.

21. The LED control method of claim 18, further comprising: generating the first and second clock signals.

22. The LED control method of claim 21, wherein the second clock signal is generated based on the first clock signal and the data signal in such a way that a ratio of a frequency of the first clock signal to a frequency of the second clock signal is determined by the data signal.

23. The LED control method of claim 18, wherein the at least one synchronization signal is a vertical synchronization signal.

* * * * *